United States Patent [19]

Makimae et al.

[11] Patent Number: 4,987,669
[45] Date of Patent: Jan. 29, 1991

[54] METHOD OF TIGHTENING SCREW

[75] Inventors: Tatsumi Makimae; Tsutomu Yamada, both of Hiroshima, all of Japan

[73] Assignee: Mazda Motor Corporation, Hiroshima, Japan

[21] Appl. No.: 477,527

[22] Filed: Feb. 9, 1990

[30] Foreign Application Priority Data

Feb. 10, 1989 [JP] Japan .................................. 1-32027

[51] Int. Cl.⁵ .............................................. B23Q 17/00
[52] U.S. Cl. .................................... 29/407; 29/525.1; 73/862.24
[58] Field of Search ........................ 29/407, 446, 525.1, 29/428; 73/761, 862.23, 862.24; 173/12

[56] References Cited

U.S. PATENT DOCUMENTS

| 4,095,325 | 6/1978 | Hashimoto et al. | 29/407 |
| 4,163,310 | 8/1979 | Sigmund | 29/407 |
| 4,413,396 | 11/1983 | Wallace et al. | 29/407 |
| 4,908,926 | 3/1990 | Takeshima et al. | 29/407 |

FOREIGN PATENT DOCUMENTS 60-14675 4/1985 Japan .

Primary Examiner—Timothy V. Eley
Attorney, Agent, or Firm—Sixbey, Friedman, Leedom & Ferguson

[57] ABSTRACT

In a method of tightening a screw member, the difference between the tightening axial force which is produced at the limit of elasticity when the friction coefficient between the screw member and a member into which the screw member is to be threaded is at a maximum and that when the friction coefficient between the screw member and the member into which the screw member is to be threaded is at a minimum is calculated, a seating torque is determined on the basis of the difference between the tightening axial forces, the screw member is threaded into the member into which the screw member is to be threaded until the tightening torque reaches the seating torque, and then the screw member is tightened by a predetermined angle.

2 Claims, 6 Drawing Sheets

METHOD OF TIGHTENING SCREW

BACKGROUND OF THE INVENTION

1. Field of the Invention

This invention relates to a method of tightening a screw.

2. Description of the Prior Art

As the method of tightening a screw such as a bolt within a limit of elasticity, there have been known a torque method and an angle method. In the torque method, tightening is terminated when the tightening torque reaches a predetermined value. On the other hand, in the angle method, tightening is terminated when the screw is rotated by a predetermined angle. The torque method is disadvantageous in that it is largely affected by the friction coefficient of the screw and the tightening axial force greatly fluctuates with change of the friction coefficient. For example, when the screw is tightened up to a tightening torque T1 in FIG. 4, the tightening axial force F fluctuates from F1 to F2 as the friction coefficient of the screw $\mu$ changes from a maximum $\mu$max to a minimum $\mu$min. Therefore, recently, the angle method has come into wide use. However, also the angle method is affected by the friction coefficient of the screw until the tightening torque reaches the seating torque, and accordingly, an attempt to obtain a high tightening axial force can lead the tightening torque to yielding range Z as shown by range X in FIG. 4.

Further, when the theoretical seating point of the screw is calculated and tightening is terminated when the screw is rotated by a predetermined angle from the theoretical seating point, the affect of the seating torque can be avoided. In this method, though the tightening axial force can be stabilized as compared with the torque method, the maximum tightening axial force must be limited to relatively low value when yield of the screw is taken into account as shown by range Y in FIG. 5.

As can be understood from the description above, it has been difficult to tighten the screw with a maximum axial force close to the limit of elasticity of the screw in accordance with either of the torque method and the angle method.

Generally, the screw yields at a lower tightening axial force as the friction coefficient of the screw increases. This is because not only tensile stress but also torsional stress acts on the screw. The torsional stress $\tau$ is represented by the following formula.

$$\tau = 16T/nd_1^3 = (8/n)F(d_2/d_1^3)(1.15\mu + \tan\beta) \qquad (1)$$

wherein $\tau$ represents the torsional stress component, T represents the tightening torque, F represents the tightening axial force, $d_1$ represents the root diameter of the screw, $d_2$ represents the effective diameter of the screw, $\mu$ represents the friction coefficient and $\beta$ represents the lead angle of the screw.

As can be understood from formula (1), the larger the friction coefficient $\mu$ is, the larger the torsional stress $\tau$ and accordingly, the screw yields at a lower tightening axial force as the friction coefficient $\mu$ of the screw increases. That is, in order to set the maximum tightening axial force close to the limit of elasticity of the screw, optimal tightening must be effected taking into account both the friction coefficient of the screw and the torsional stress.

SUMMARY OF THE INVENTION

In view of the foregoing observations and description, the primary object of the present invention is to provide a method of tightening a screw in which a large tightening axial force close to the limit of elasticity of the screw can be constantly obtained irrespective of the friction coefficient of the screw.

The inventors has made this invention on the basis of the fact that so long as the seating torque is optimally set, an extremely large tightening axial force close to the limit of elasticity of the screw can be constantly obtained when the screw is rotated by a predetermined angle after the tightening torque reaches the seating torque.

That is, in accordance with the present invention, the difference between the tightening axial force which is produced at the limit of elasticity when the friction coefficient between a screw member and a member into which the screw member is to be threaded is at a maximum and that when the friction coefficient between the screw member and the member into which the screw member is to be threaded is at a minimum is calculated, a seating torque is determined on the basis of the difference between the tightening axial forces, the screw member is threaded into the member into which the screw member is to be threaded until the tightening torque reaches the seating torque, and then the screw member is tightened by a predetermined angle.

DETAILED DESCRIPTION OF THE INVENTION

Figure 6:
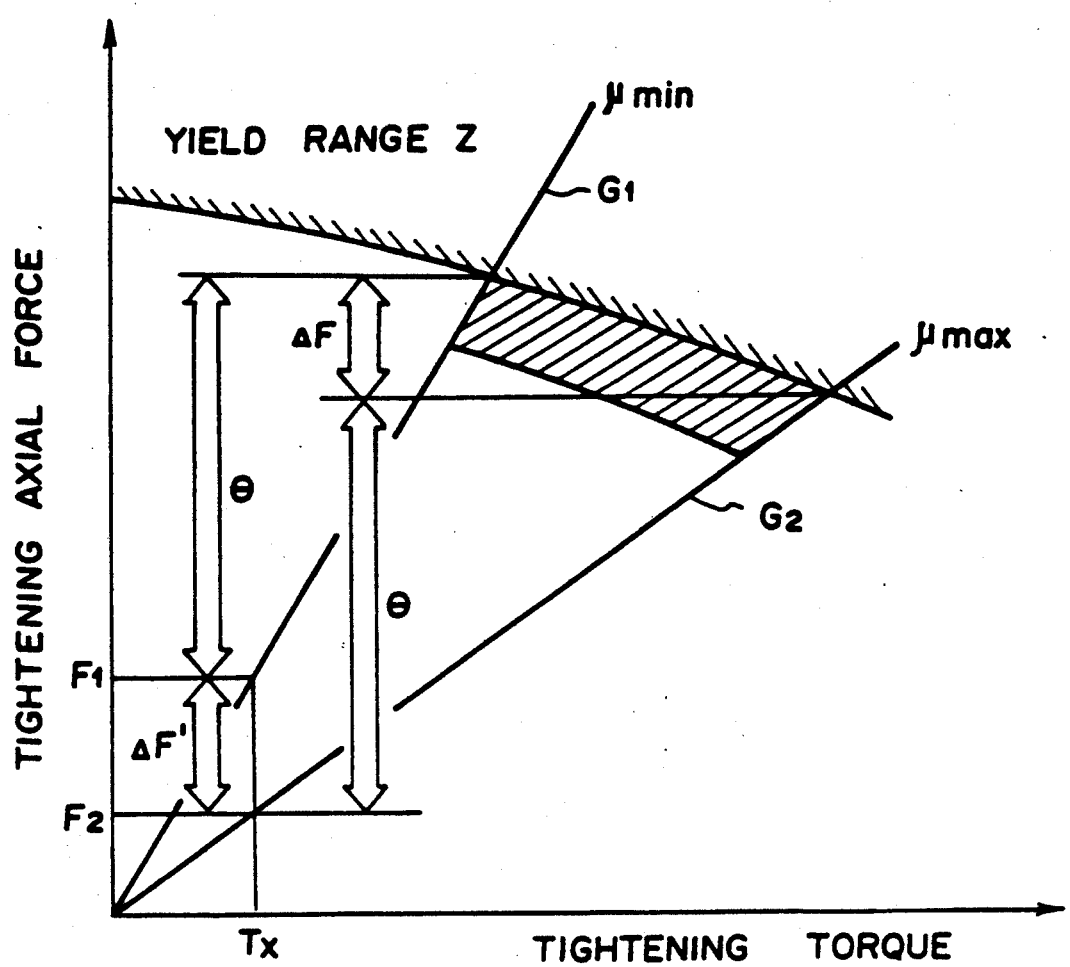
FIG. 6 is a view for illustrating the method of determining the seating torque in the method of tightening a screw member in accordance with the present invention.

The principle of the present invention will be described with reference to FIG. 6, hereinbelow. In FIG. 6, line $G_1$ shows the relation between the tightening axial force F and the tightening torque T when the friction coefficient is at a minimum value $\mu$min and line $G_2$ shows the relation between the tightening axial force F and the tightening torque T when the friction coefficient is at a maximum value $\mu$max. When the inclinations of the lines $G_1$ and $G_2$ are respectively represented by $K_1$ and $K_2$, the lines $G_1$ and $G_2$ are represented by the following formulas.

$$F = K_1 T \qquad (2)$$

$$F = K_2 T \qquad (3)$$

The difference ΔF between the tightening axial force which is produced at the limit of elasticity when the friction coefficient between the screw member and the member into which the screw member is to be threaded is at a maximum and that when the friction coefficient between the screw member and the member into which the screw member is to be threaded is at a minimum (will be referred to as "the tightening axial force difference ΔF", hereinbelow) is determined on the basis of the formulas (1), (2) and (3) and the size and shape of the screw member. The tightening axial force difference ΔF' which is equal to the tightening axial force difference ΔF and corresponds to the seating torque Tx can be derived from the following formulas.

$$F_1 = K_1 \cdot Tx \quad (4)$$

$$F_2 = K_2 \cdot Tx \quad (5)$$

$$\therefore F_1 - F_2 = Tx(K_1 - K_2)$$

Accordingly, when it is assumed that $F_1 - F_2 = \Delta F'$, the optimal seating torque Tx when $\Delta F = \Delta F'$ is given by the following formula.

$$Tx = \Delta F/(K_1 - K_2) \quad (6)$$

When the screw member is first tightened until the tightening torque reaches the optimal seating torque and then further tightened by a predetermined angle θ, a large tightening axial force F close to the limit of elasticity of the screw can be constantly obtained irrespective of the friction coefficient of the screw.

Figure 1:
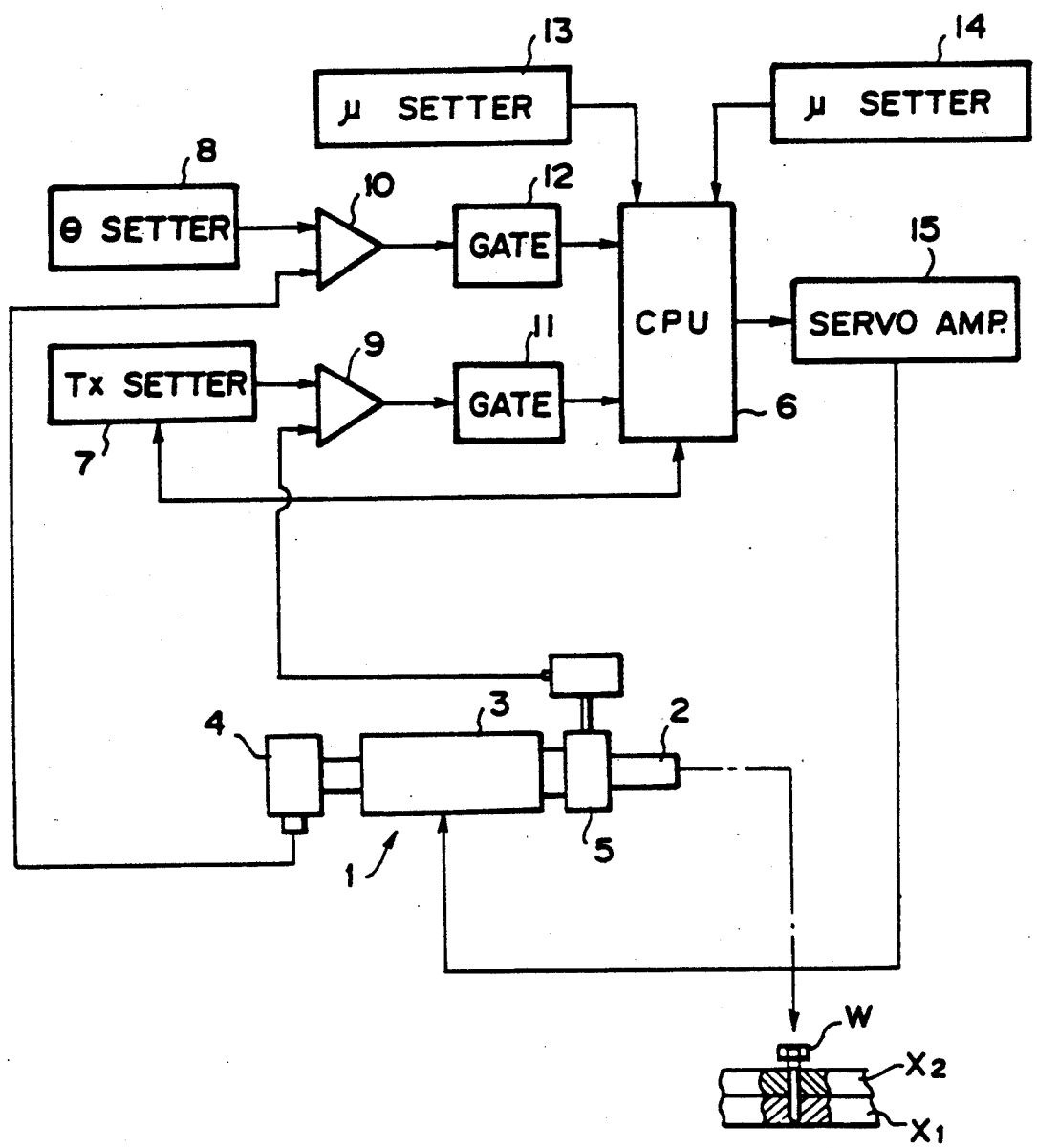
FIG. 1 shows a screw tightening apparatus which carries out the method of the present invention.

FIG. 1 shows a screw tightening apparatus which carries out the method of the present invention. The apparatus is for tightening a bolt W for mounting a cylinder head X2 on a cylinder block X1.

In FIG. 1, a nut runner 1 comprises a socket 2 which is set to a bolt, a motor 3 which rotates the socket 2, an angle encoder 4 which detects the rotating angle of the socket 2 and a torque transducer 5 which detects the tightening torque. A CPU 6 controls the nut runner 1, and a torque setter 7 sets the torque on the basis of a seating torque Tx calculated by the CPU 6. An angle setter 8 sets the angle θ by which the socket 2 is to be rotated after the tightening torque reaches the seating torque Tx. A comparator 9 compares the value (the seating torque Tx) set by the torque setter 7 with the value detected by the torque transducer 5, and a comparator 10 compares the value (the angle θ) set by the angle setter 8 with the value detected by the angle encoder 4. The output signals from the comparators 9 and 10 are input into the CPU 6 through gates 11 and 12. Friction coefficient setters 13 and 14 respectively set the minimum value μmin and the maximum value μmax of the friction coefficient of the bolt. A servo amplifier 15 transmits the output of the CPU 6 to the motor 3.

Figure 2:
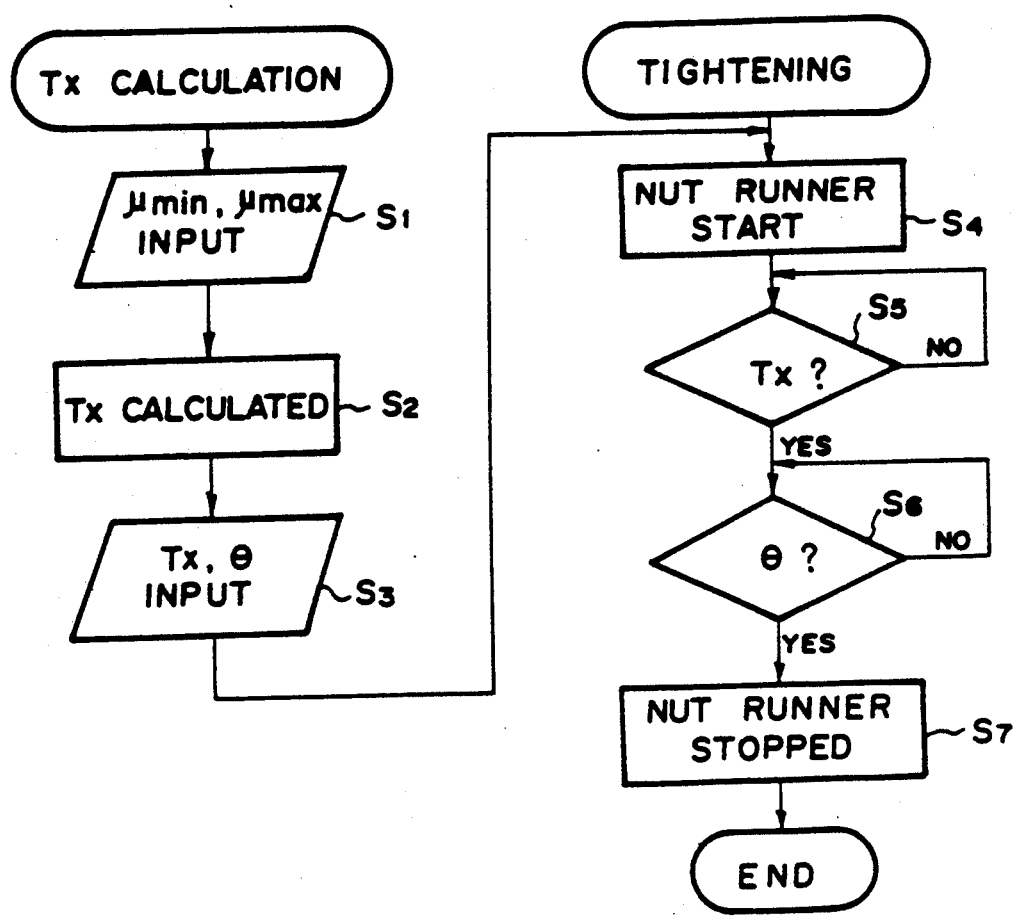
FIG. 2 is a flow chart illustrating the operation of the apparatus.

FIG. 2 shows the operation of the screw tightening apparatus of this embodiment. When tightening the bolt, the seating torque for the bolt is first calculated. That is, in step S1, the friction coefficient setters 13 and 14 respectively input the minimum value μmin and the maximum value μmax of the friction coefficient specific to the bolt into the CPU 6. The CPU 6 calculates the seating torque Tx on the basis of the formula (5) in step S2. Assuming that ΔF is equal to 600Kg, K₁ is equal to 770 and K₂ is equal to 477, $Tx = \Delta F/(K_1 - K_2) = 2.05 Kg$. The seating torque Tx thus obtained is input into the comparator 9 from the torque setter 7. The angle setter 8 inputs into the comparator 10 the angle θ which has been set. (Step S3) In this condition, the nut runner 1 is started, and the bolt is tightened until the rotating angle of the nut runner 1 reaches the angle θ after the time the torque detected by the torque transducer 5 reaches seating torque Tx. (steps S4 to S7).

Figure 3:
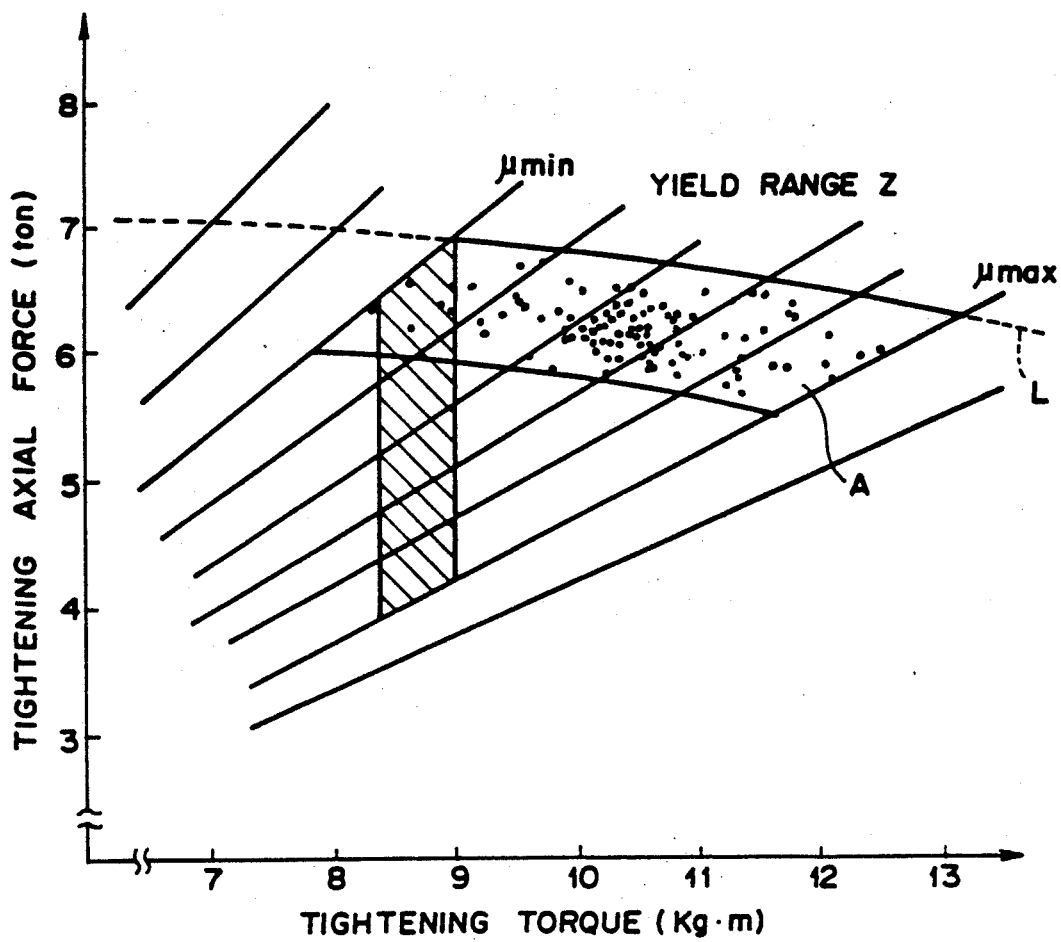
FIG. 3 shows the measured tightening axial force when the bolts were tightened by the apparatus.
Figure 4:
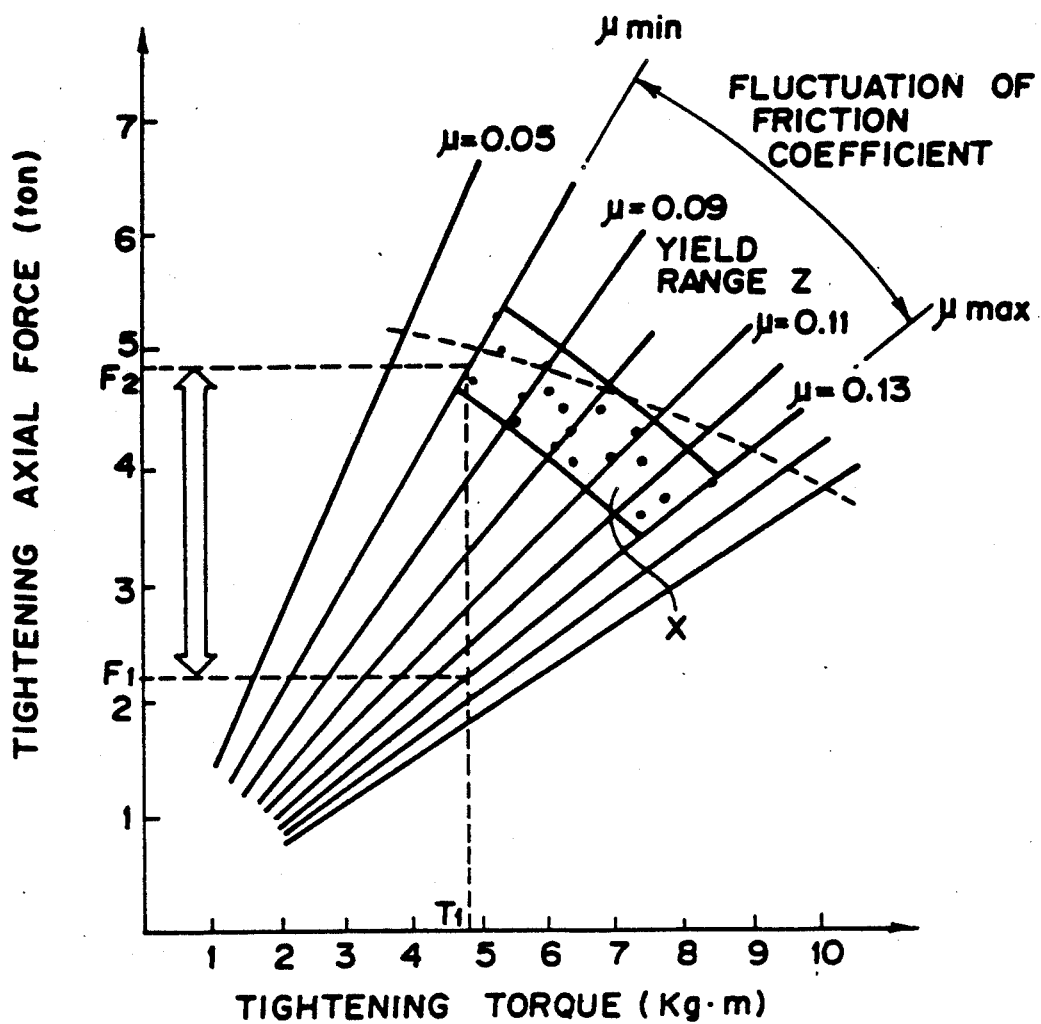
FIG. 4 shows the tightening axial forces which are produced when the seating torque is high.
Figure 5:
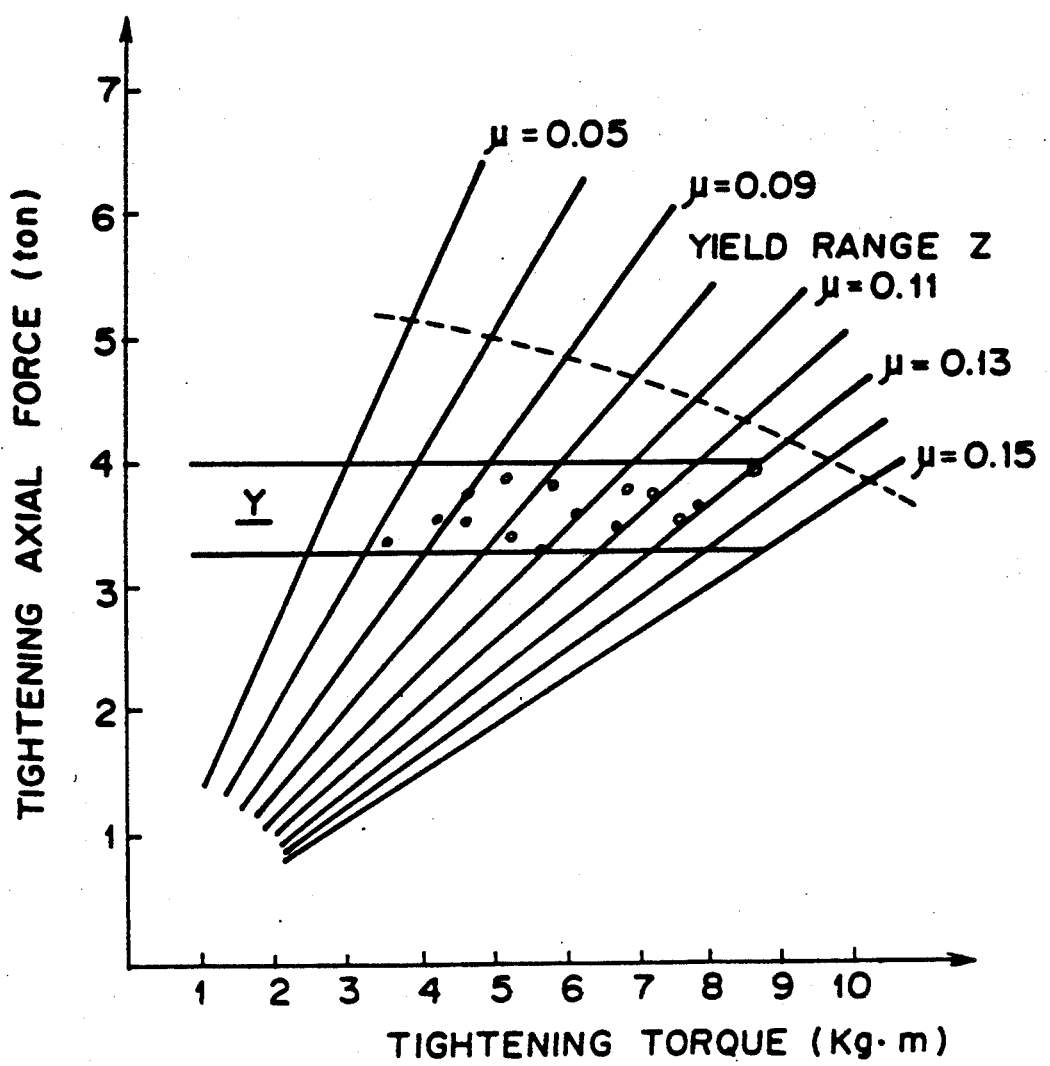
FIG. 5 shows the tightening axial forces which are produced when the screw members are tightened by the seating-torque-angle method.

FIG. 3 shows the measured tightening axial force when the bolts were tightened in the manner described above. As can be understood from FIG. 3, the tightening axial forces of the bolts distributed in range A along an elasticity limit line L which defined the lower limit of the yield range Z. That is, an extremely high tightening axial force could be obtained irrespective of the friction coefficient. The slight fluctuation of the tightening axial forces in the range A is due to fluctuation of the rigidity of the cylinder heads. When the bolts are tightened by the torque method, the tightening axial forces can distribute over a wide range represented by the hatched portion in FIG. 3.

We claim:

1. A method of tightening a screw member comprising the steps of
    determining the difference between a tightening axial force which is produced at a limit of elasticity when the friction coefficient between a screw member and a member into which the screw member is to be threaded is at a maximum and that when the friction coefficient between the screw member and the member into which the screw member is to be threaded is at a minimum,
    determining a seating torque on the basis of the difference between the tightening axial forces, and
    tightening the screw member by a predetermined angle after a tightening torque reaches the seating torque.

2. A method as defined in claim 1 in which said difference between the tightening axial forces is determined on the basis of the relation between the tightening axial force and the tightening torque when the friction coefficient is at the minimum and the relation between the tightening axial force and the tightening torque when the friction coefficient is at the maximum, and said seating torque is determined as the tightening torque at which the difference between the tightening axial force which is produced for a given tightening torque when the friction coefficient is at the minimum and the tightening axial force which is produced for the given tightening torque when the friction coefficient is at the maximum is substantially equal to said difference between the tightening axial force which is produced at the limit of elasticity when the friction coefficient is at the maximum and that when the friction coefficient at the minimum on the basis of the relation between the tightening axial force and the tightening torque when the friction coefficient is at the minimum and the relation between the tightening axial force and the tightening torque when the friction coefficient is at the maximum.

* * * * *